(12) United States Patent
Schaad (10) Patent No.: US 7,831,978 B2
(45) Date of Patent: Nov. 9, 2010

(54) REVIEW MECHANISM FOR CONTROLLING THE DELEGATION OF TASKS IN A WORKFLOW SYSTEM

(75) Inventor: Andreas Schaad, Bad Pyrmont (DE)

(73) Assignee: SAP AG, Walldorf (DE)

( * ) Notice: Subject to any disclaimer, the term of this patent is extended or adjusted under 35 U.S.C. 154(b) by 1481 days.

(21) Appl. No.: 11/016,026

(22) Filed: Dec. 16, 2004

(65) Prior Publication Data
US 2006/0136495 A1 Jun. 22, 2006

(51) Int. Cl.
*G06F 9/46* (2006.01)
*G06F 17/00* (2006.01)

(52) U.S. Cl. .................. 718/106; 715/208; 715/234; 705/8; 705/9

(58) Field of Classification Search ............. 718/1, 718/100, 101, 102, 103, 104, 105, 106, 107, 718/108; 715/208, 234; 705/8–9
See application file for complete search history.

(56) References Cited

U.S. PATENT DOCUMENTS

| | | | |
|---|---|---|---|
| 5,490,097 A * | 2/1996 | Swenson et al. ............ 703/2 |
| 5,530,861 A * | 6/1996 | Diamant et al. ............ 705/8 |
| 5,799,297 A | 8/1998 | Goodridge et al. |
| 5,960,404 A * | 9/1999 | Chaar et al. ............... 705/8 |
| 6,026,365 A | 2/2000 | Hayashi |
| 6,088,679 A | 7/2000 | Barkley |
| 6,101,481 A * | 8/2000 | Miller ..................... 705/9 |
| 6,493,731 B1 * | 12/2002 | Jones et al. ............. 715/234 |
| 6,507,845 B1 * | 1/2003 | Cohen et al. ............ 707/100 |
| 6,539,404 B1 | 3/2003 | Ouchi |
| 6,658,568 B1 | 12/2003 | Ginter et al. |
| 6,675,261 B2 | 1/2004 | Shandony |
| 6,678,716 B1 | 1/2004 | Pronsati, Jr. et al. |
| 6,741,232 B1 | 5/2004 | Siedlikowski |
| 6,782,379 B2 | 8/2004 | Lee |
| 6,850,895 B2 | 2/2005 | Brodersen et al. |

(Continued)

FOREIGN PATENT DOCUMENTS

WO WO-01/33468 5/2001

(Continued)

OTHER PUBLICATIONS

"BEA WebLogic Process Integrator Overview 2.0", available at http://e-docs.bea.com/wlintegration/v2_0/processintegrator/studio/ch1.htm#1216782 (2001), 11 pgs.

(Continued)

*Primary Examiner*—Chat C Do
*Assistant Examiner*—Jennifer N To
(74) *Attorney, Agent, or Firm*—Schwegman, Lundberg & Woessner, P.A.

(57) ABSTRACT

A method for creating a review task includes receiving task data, the task data including information on a main task to be performed. Delegation data is received, the delegation data including information identifying a first delegator of the main task and a first delegatee to perform the main task. A review task is created, with the review task having as its object at least aspects of the main task. The review task is assigned to the first delegator of the main task, and review task data is stored based on the completed main task.

20 Claims, 9 Drawing Sheets

U.S. PATENT DOCUMENTS

| | | | |
|---|---|---|---|
| 6,859,523 B1* | 2/2005 | Jilk et al. | 379/32.01 |
| 7,007,232 B1* | 2/2006 | Ross et al. | 715/208 |
| 7,032,181 B1 | 4/2006 | Farcasiu | |
| 2002/0029272 A1* | 3/2002 | Weller | 709/226 |
| 2002/0078432 A1* | 6/2002 | Charisius et al. | 717/102 |
| 2003/0023675 A1 | 1/2003 | Ouchi et al. | |
| 2003/0149714 A1 | 8/2003 | Casati et al. | |
| 2004/0025048 A1 | 2/2004 | Porcari et al. | |
| 2004/0103014 A1* | 5/2004 | Teegan et al. | 705/8 |
| 2004/0104939 A1 | 6/2004 | Locke et al. | |
| 2004/0133876 A1 | 7/2004 | Sproule | |
| 2004/0143811 A1* | 7/2004 | Kaelicke et al. | 717/101 |
| 2004/0148213 A1* | 7/2004 | Aziz et al. | 705/8 |
| 2005/0028158 A1* | 2/2005 | Ferguson et al. | 718/100 |
| 2005/0038707 A1 | 2/2005 | Roever et al. | |
| 2006/0107265 A1 | 5/2006 | Schulz et al. | |
| 2006/0136495 A1 | 6/2006 | Schaad | |
| 2007/0016465 A1 | 1/2007 | Schaad | |

FOREIGN PATENT DOCUMENTS

| | | |
|---|---|---|
| WO | WO-03/017055 | 2/2003 |

OTHER PUBLICATIONS

"Monitoring Workflows BEA WebLogic Integration, Release 2.1", available at http://e-docs.bea.com/wlintegration/v2_1/studio/ch10.htm#1220539 (2001), 19 pgs.

"Workflow Management Coalition", website: http://www.wfmc.org, 4 pgs.

Bertino, E, et al., "An extended authorization model for relational databases", *IEEE Transactions on Knowledge and Data Engineering*, 9(1) (1997), 85-101.

Damianou, Nicodemos, et al., "Ponder: A Language for Specifying Security and Management Policies for Distributed Systems", The Language Specification, Version 2.1, Imperial College Research Document, available at http://www-dse.doc.ic.ac.uk/policies, (Apr. 3, 2000), 1-42.

Damianou, Nicodemos, et al., "The Ponder Policy Specification Language", Policies or Distributed Systems and Networks. Springer Lecture Notes in Computer Science. Bristol, UK,, (Jan. 29-31, 2001), 18-39.

Fakas, et al., "A peer to peer architecture for dynamic workflow management", *Information and Software Technology 46*, Document available at: http://www.docm.mmu.ac.uk/STAFF/G.Fakas/p2pwf-ist-fakas-bill.pdf,(2004), 423-31.

Jackson, Daniel, et al., "A Micromodularity Mechanism", Joint 8th European Software Engineering Conference (ESEC) and 9th ACM SIGSOFT Symposium on the Foundations of Software Engineering (FSE-9), Vienna, Austria, (Sep. 10-14, 2001), 1-14.

Joeris, G, et al., "Workflow Support for Inter-Organizational Engineering and Production Processes", In *International Journal of Agile Engineering, Special Issue on Information Management for Productivity Enhancement*, (2000), 15 pgs.

Minsky, Naftaly H., et al., *Law-Governed Interaction: a Coordination and Control Mechanism for Heterogeneous Distributed Systems, ACM TOSEM*, 9(3), (1-31), 2000.

Moffett, Jonathan D., "Delegation of Authority Using Domain-Based Access Rules", A thesis submitted in partial fulfillment of the requirements for the degree of Doctor of Philosophy of the University of London, and the Diploma of Imperial College of Science, Technology & Medicine, (Jul. 1990, Corrected Sep. 1990), 55-76.

Mullins, J, "Delegation and Management", *British Journal of Administrative Management*, 31(7), (1981), 218-224.

Pugh, Derek S., *Organization Theory—Selected Readings*, Harmondsworth, Middlesex : Penguin Books, 4th Edition, (1997).

Sandhu, R. S., "Role-based Access Control Models", *IEEE Computer*, 29(2), (Feb. 1996), 38-47.

Schaad, Andreas, et al., "Delegation of Obligations", IEEE Policies for Distributed Systems and Networks (POLICY 2002), (Jun. 5-7, 2002), 1-11.

Schwartz, D, "A loosely coupled peer to peer workflow system", Masters Thesis, Technical University of Vienna, Complete document available at: http://www.infosys.tuwien.ac.at/Staff/sd/DA/DanielSchwarz.pdf,(May 13, 2004), 21-66.

Yao, Walt, et al., "A Model of OASIS Role-Based Access Control and its Support for Active Security", SACMAT-01, Chantilly, Virginia, USA. (May 3-4, 2001), 171-181.

Barka, Ezedin , et al., "Framework for Role-Based Delegation Models", *Proceedings of the 16th Annual Computer Security Applications Conference*, (2000), 1-8.

Christianson, B. , et al., "Delegation of Responsibilities (Position Paper)", *Springer-Verlag Berlin Heidelberg 1996*, (Eds) Security Protocols, LNCS 1550 pp. 118,(1998),1-7.

Georgakopoulos, Diimitrios , et al., "An Overview of Workflow Management: From Process Modeling to Workflow Automation Infrastructure", *Distributed and Parallel Databases*, 3, 119-153 (1995) *Kluwer Academic Publishers, Boston Manufactured in the Netherlands*, (1995), 119-153.

Kern, Axel , et al., "An administration concept for the enterprise role-based access control model", *Proceedings of the eighth ACM symposium on Access control models and technologies*, (2003),3-11.

No Author Listed, "The Why and How of Delegations in Distributed Security Systems", (No Date Listed).

Policy 2001, "Workshop Program, Position Papers, Invited Presentations", *Workshop on Policies for Distributed Systems and Networks*, (Jan. 2001).

Schaad, Andreas , "A Framework for Organisational Control Principles", *Doctor of Philosophy—University of York*, (Jul. 2003),1-288.

Schaad, Andreas , et al., "A Framework for Organisational Control Principles", *Proceedings of the 18th Annual Computer Security Applications Conference*, (2002),1-10.

Schaad, Andreas , et al., "An Extended Analysis of Delegating Obligations", *SAP Labs France*, (Jul. 2004),1-15.

Schaad, Andreas , et al., "Separation, review and supervision controls in the context of a credit application process: a case study of organisational control principles", *Proceedings of the 2004 ACM symposium on Applied computing*, (2004), 1380-1384.

Schaad, Andreas , et al., "The Incorporation of Control Principles into Access Control Policies", *Policy 2001: Workshop on Policies for Distributed Systems & Networks*, Bristol UK, (2001),1-4.

Schaad, Andreas , et al., "The role-based access control system of a European bank: a case study and discussion", *Proceedings of the sixth ACM symposium on Access control models and technologies*, (2001),3-9.

Vogt, Gerald , "Delegation of Tasks and Rights", *12th International Worshop on Distributed Systems: Operations and Management*, (Oct. 15-17, 2001), 1-11.

Zhang, Longhua , et al., "A Rule-Based Framework for Role-Bases Delegation and Revocation", *ACM Transactions on Information and System Security*, vol. 6, No. 3 Aug. 2003, pp. 404-441, (Aug. 2003), 1-38.

"U.S. Appl. No. 11/183,272, Response filed Jul. 21, 2008 to Restriction Requirement mailed Jun. 25, 2008", 5 pgs.

"U.S. Appl. No. 11/183,272 response filed Dec. 15, 2008 to Non-Final Office Action mailed Sep. 16, 2008", 10 pgs.

"U.S. Appl. No. 11/183,272, Non-Final Office Action mailed Sep. 16, 2008.", 14 pgs.

"U.S. Appl. No. 11/183,272, Final Office Action mailed Feb. 19, 2009", 18 pgs.

"U.S. Appl. No. 11/183,272, Response filed Apr. 7, 2009 to Final Office Action mailed Feb. 19, 2009", 12 pgs.

"U.S. Appl. No. 11/183,272, Restriction Requirement mailed Jun. 25, 2008", 7 pgs.

"U.S. Appl. No. 11/183,272 Final Office Action mailed Feb. 19, 2009", 20 pgs.

"U.S. Appl. No. 11/183,272, Advisory Action mailed Apr. 16. 2009", 3 pgs.

"U.S. Appl. No. 11/183,272, Non-Final Office Action mailed Jan. 13, 2010", 20 pgs.

"U.S. Appl. No. 11/183,272, Non-Final Office Action mailed Jul. 6, 2009", 20 Pgs.

"U.S. Appl. No. 11/183,272, Response filed Oct. 6, 2009 to Non Final Office Action mailed Jul. 6, 2009", 12 pgs.

Adam, N., et al., "Modeling and Analysis of Workflows Using Petri Nets", *Journal of Intelligent Information Systems*, vol. 10, Kluwer Academic Publishers, (1998), 131-158.

Bertino, E., et al., "The Specification and Enforcement of Authorization Constraints in Workflow Management Systems", *ACM Transcations on Information and Systems Security* vol. 2, No. 1, 1999, ACM 1094-9224/99/0200-0065),(Feb. 1999), 65-104.

Eder, J., "The Workflow Activity Model WAMO", Proceedings of the 3rd Int. Conference on Cooperative Information Systems, (1995), 12 pgs.

Georgakopoulos, D., et al., "An Overview of Workflow Management: Form Process Modeling to Workflow", *Distributed and Parallel Databases*, 1995 Kluwer Academic Publishers, Boston, Manufactured in the Netherlands, (1995), 119-153.

Payne, S., et al., "Task-Action Grammars: A Model of the Mental Representation of Task Languages", *Human-Computer Interaction* vol. 2, 1986, Lawrence Erlbaum Associates, Inc, (1986), 93-133.

Wainer, J., et al., "W-RBAC A Workflow Security Model Incorporating Controlled Overriding of Constraints", *International Journal of Cooperative Information Systems* vol. 12, No. 4, (2003), 455-485.

Wainer, J., et al., "A Fine-grained, Controllable, User-to-User Delegation Method in RBAC", *SACMAT, Stockholm, Sweden, Copyright 2005*, ACM 1 - 59593-045-0/05/0006, (Jun. 1, 2005), 59-66.

Wainer, J., et al., "Security Management in the presence of delegation and revocation in workflow systems", *Istituto de Coputacao, Techinical Report*, (Oct. 2001), C-01-014.

"U.S. Appl. No. 11/183,272, Response filed Apr. 1, 2010 to Non Final Office Action mailed Jan. 13, 2010", 12 pgs.

Zurmuehlen, M., "Organizational Management in Workflow Applications—Issues and Perspectives", Information Technology and Management, © 2004 Kluwer Academic Publishers. Manufactured in The Netherlands), (2004), 5,271-291.

\* cited by examiner

REVIEW MECHANISM FOR CONTROLLING THE DELEGATION OF TASKS IN A WORKFLOW SYSTEM

This application relates to a method and system for creating a review task in application programs, and to a machine-readable medium comprising instructions to perform this method.

BACKGROUND

Tasks or obligations in an application program environment typically depend on the specific application domain. Tasks or obligations may for example be the updating of a file in a database, entering a customer's details in the context of opening an account, approving or rejecting a credit, or opening a legal case.

In the paper-based world, tasks are continuously created, delegated or discharged according to the overall goals of an organisation and the general principles governing the distribution of work within an organisation. These principles would typically comprise a framework for maintaining control over the supervision and responsibility of task completion.

Although workflow products (e.g., the SAP Webflow product), and non-workflow products (e.g., Outlook) support the delegation of tasks, the available delegation functionalities of these application programs are rudimentary. This lack of sophistication often results in uncertainty as to the person responsible for currently performing a task, the origin and ownership of the initial task and the delegation sequence of the task. It may further be difficult for a principal who delegated a task to find out whether a task has in fact been completed. Also, the present delegation functionalities provided by application programs may not provide the information required to identify the person who is ultimately responsible to ensure that each single operation in a task has been performed.

In application programs, whether based on workflow or not, a need has therefore been identified to provide a method that would enable improved management of delegated tasks.

Prior art systems relate mostly to the requirements pertaining to a delegation and the rules governing such delegation in application systems.

In prior art systems, the concept of delegation and its technical realisation has only been considered in the context of information security, e.g. delegation of access rights at an operating system level. In prior art systems the concept of "review" has only been considered in the context of obligation/event-condition-action rules in policy-based distributed systems such as the management of firewalls or routers.

SUMMARY OF THE INVENTION

According to a first aspect of the invention there is provided a method for creating a review task. The method includes receiving task data, the task data including information on a main task to be performed. Delegation data is received, the delegation data including information identifying a first delegator of the main task and a first delegates to perform the main task. A review task is created, with the review task having as its object at least aspects of the main task. The review task is assigned to the first delegator of the main task, and review task data is stored based on the completed main task.

Other features of the present invention will be apparent from the accompanying drawings and from the detailed description that follows.

BRIEF DESCRIPTION OF DRAWINGS

The present invention is illustrated by way of example and not limitation in the figures of the accompanying drawings, in which like references indicate similar elements and in which.

DETAILED DESCRIPTION OF THE INVENTION

In the following detailed description of the exemplary embodiments, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

An exemplary embodiment of the present invention is described below with reference to a Use Case and Data model, as well as a flow diagram. The data structures used by an exemplary embodiment of present invention are defined in relation to this flow diagram. The data structure of a review task created by an exemplary method is described with reference to a block diagram, followed by a sequence diagram showing the interaction between a delegator, delegatee, data models and other modules of the system of an exemplary embodiment of the present invention. A detailed flow diagram is then used to describe a further embodiment of the present invention, followed by a system diagram of the present invention. Lastly, machine for implementing the method is described in detail.

Figure 1:
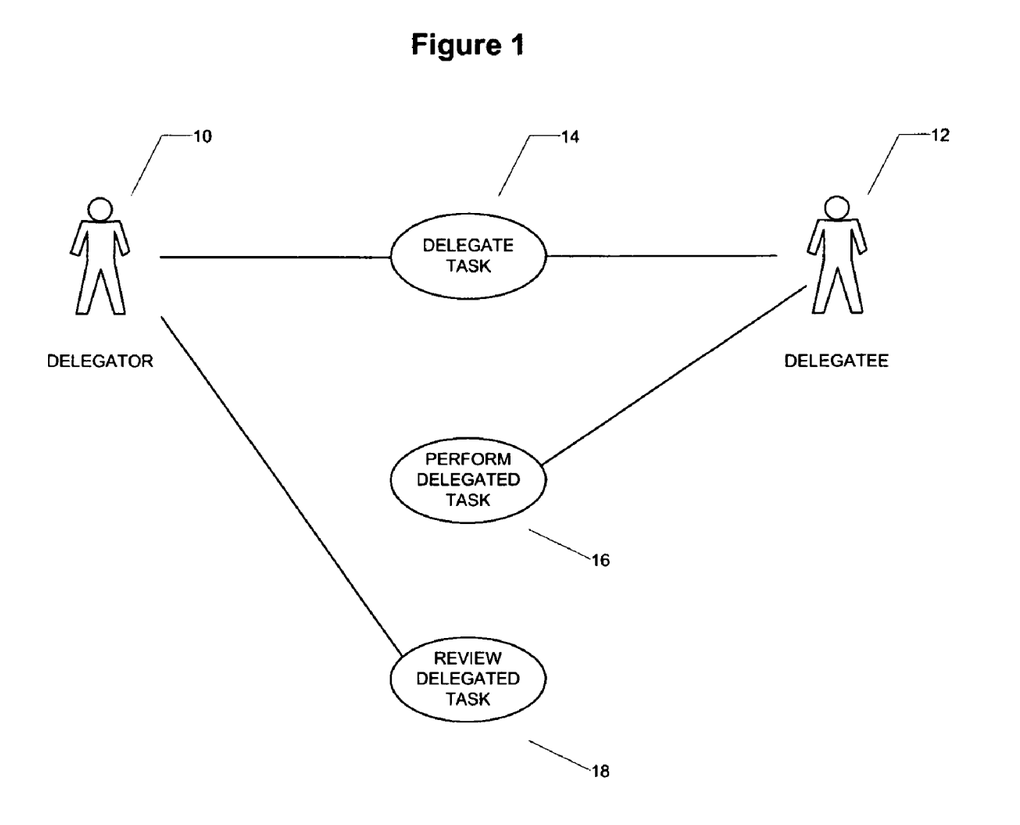
FIG. 1 is a diagrammatic representation of a Use Case model of the relationship between a delegator, a delegates and a delegated task according to an exemplary embodiment of the present invention.

FIG. 1 shows a Use Case model with a delegator 10 and a delegatee 12. In an application program, whether workflow based (e.g., SAP Webflow) or non-workflow based (e.g., Outlook), the delegator is responsible for the completion of a main task. The delegator may however choose to delegate this main task, now the delegated task 14, to the delegatee 12. Such delegation may be necessitated by circumstances such as workload or efficiency.

After delegation, the delegates 12 takes over the responsibility for performing the delegated task (shown by 16), while the delegator 10 is responsible for reviewing the performed or completed delegated task (shown by 18) or at least aspects thereof. This review of the main task takes the form of a review task that is created by a review module, according to an exemplary embodiment of the invention and described below. The review task is performed on evidence that is created on the completion of the main task and this evidence therefore forms the basis of the review task.

An exemplary implementation of the invention is in the context of a bookkeeping department. An accountant, the delegator, may not be able to process all current invoices from suppliers and decides to delegate the processing of invoices with a smaller value, i.e. the main task, to a junior accountant, the delegatee. The junior accountant now has to perform the delegated task and the senior accountant has to review the task that was initially delegated. This review task may take the form of checking that all supplier invoices have been entered into the accounting system. Continuing the example, the evidence that is associated with the review task and that will be presented to the senior accountant as evidence that the delegated task has been completed, may comprise an entry for the invoice amount within a general ledger.

Figure 2:
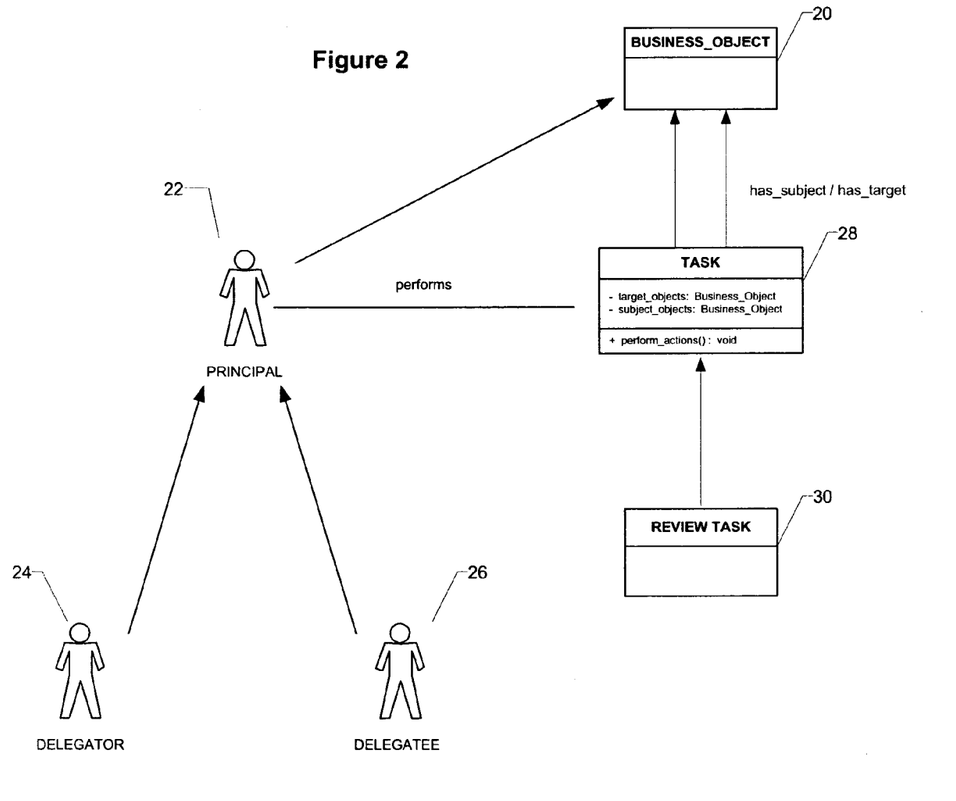
FIG. 2 is a diagrammatic representation of a Data model defining business objects, principals in an application program, as well as the structure of a task as used in an exemplary embodiment of the present invention.

Similarly, an exemplary context may be a loan application in a bank. In this example, a "four-eye" principle requires a clerk to delegate one or more tasks in a loan application workflow to his colleague. The colleague performs the delegated task, but the first clerk being the delegator or delegating principal still needs to review the completed task. In this example, the evidence associated with the review task may be the absence of exceptions reported by the control of the loan processing application FIG. 2 shows a data model for an exemplary embodiment of the present invention, defining business objects, principals in an application program, as well as the structure of a task. Typically, business objects are the general set of resources of a company. Business objects 20 may be a principal 22 (e.g. delegators 24 and delegates 26), as well as the task 28 a principal 22 has to perform. Each task 28 in an application program is defined by two general attributes:

Target_objects: which are the business objects (or resource, e.g., an account) that a set of actions defined in the task are to be performed on.

Subject_objects: the business object (e.g., principal) that has to perform the task.

According to these attributes, the subject and target information of the main task therefore defines who should perform the task and also defines what resource the task has to be performed on.

The review task 30 may also have the two attributes, e.g., a target and subject, and the specific attributes of the review task are described in detail below. Various business objects 20 form the target object and the subject object of a task.

Figure 3:
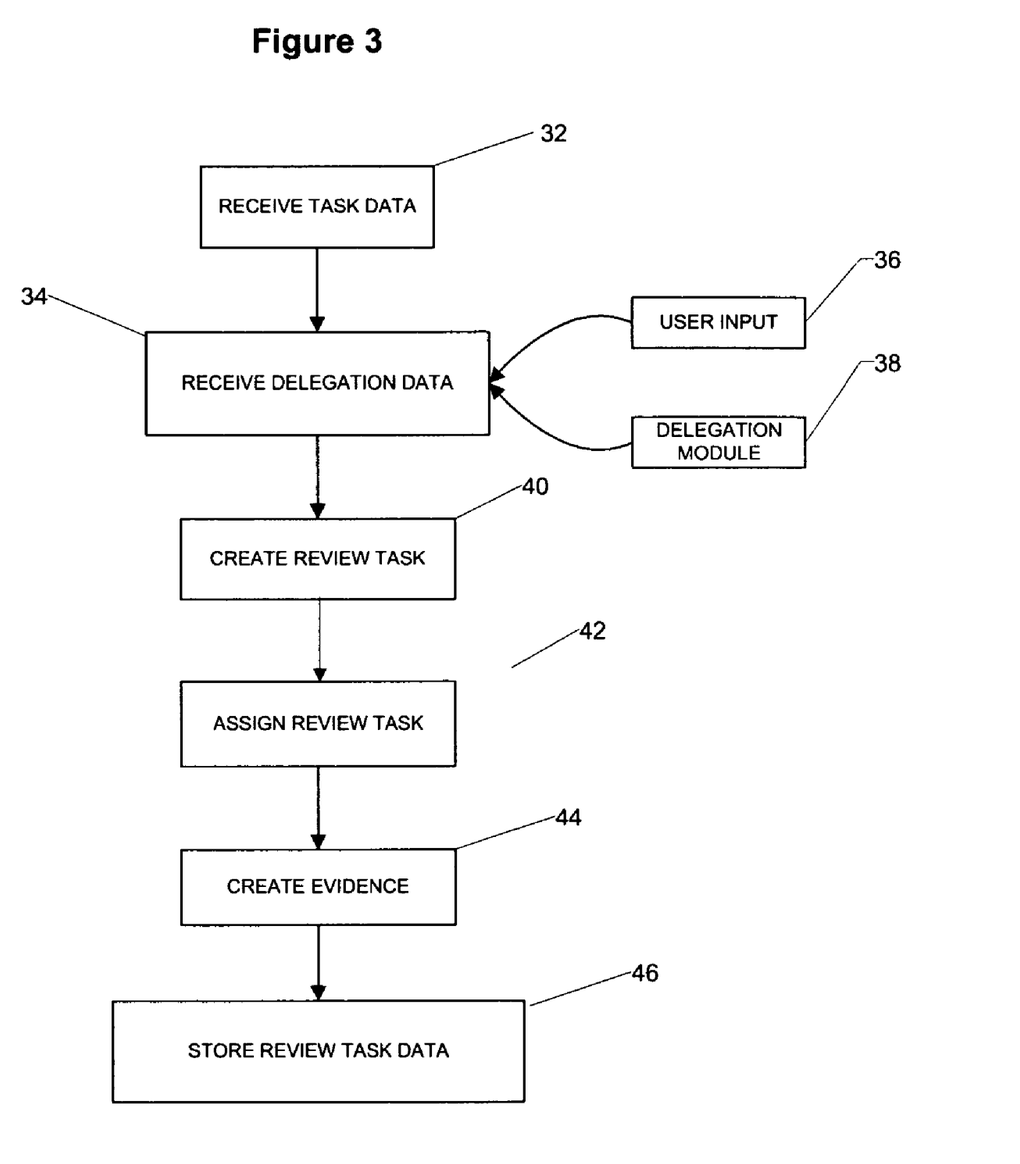
FIG. 3 is a simplified flow diagram of the method according to an example embodiment of the present invention.
Figure 4:
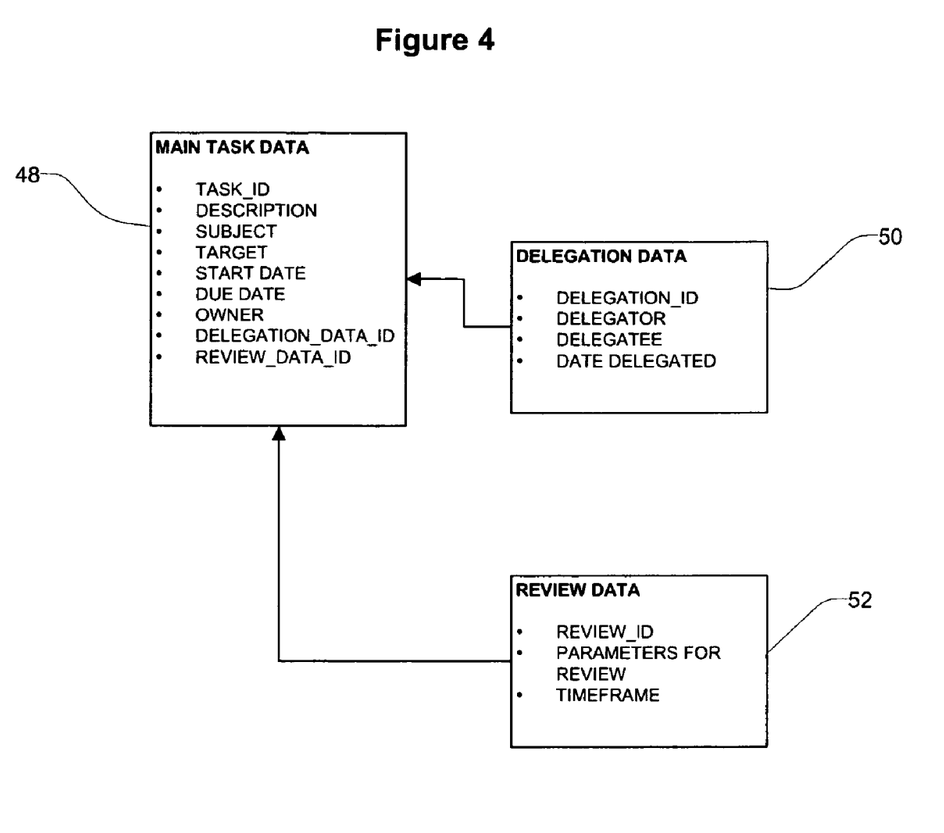
FIG. 4 is a block diagram showing the data structure for main task data, delegation data and review data as used in an exemplary embodiment of the present invention.

FIG. 3 shows a flow diagram illustrating a method of creating a review task according to a first embodiment of the present invention. In an application program, task data defining a main task to be performed, is received in operation 32. This data is typically entered by a principal via a user interface. As shown in FIG. 4, the main task data 48 of the main task includes task identification data (e.g., the name of the task) and a task description (e.g., the set of instructions to be completed to perform the task). The main task data 48 further includes data identifying the subject of the main task (e.g., the principal that has to perform the main task), and data identifying the target of the main task. As mentioned above, the target of the main task may be the business object or resources on which the set of actions defined by the task is to be performed.

Further information included in the main task data 48 may be the start date, due date and owner of the main task. As will be explained later, the main task data 48 also includes delegation data identification information that is used to link possible future delegations and the respective data of such delegations to the main task. Review data identification information is also included in the main task data 48, similarly to link associated review data to the main task.

Returning to FIG. 3, delegation data is received in operation 34, either via a user interface 36 or via a delegation module 38 and database. The delegation data 50, as indicated in the data structure of FIG. 4, includes information identifying a first delegator of the main task. It will be appreciated that, in the context of the example, the creator of the main task is the first delegator. Delegation data 50 further includes information identifying a first delegatee which takes over the responsibility to perform the main task. The delegation data 50 also includes delegation identification data (stored under the main task data) and delegation details, such as the date and time when the main task was delegated.

Figure 8:
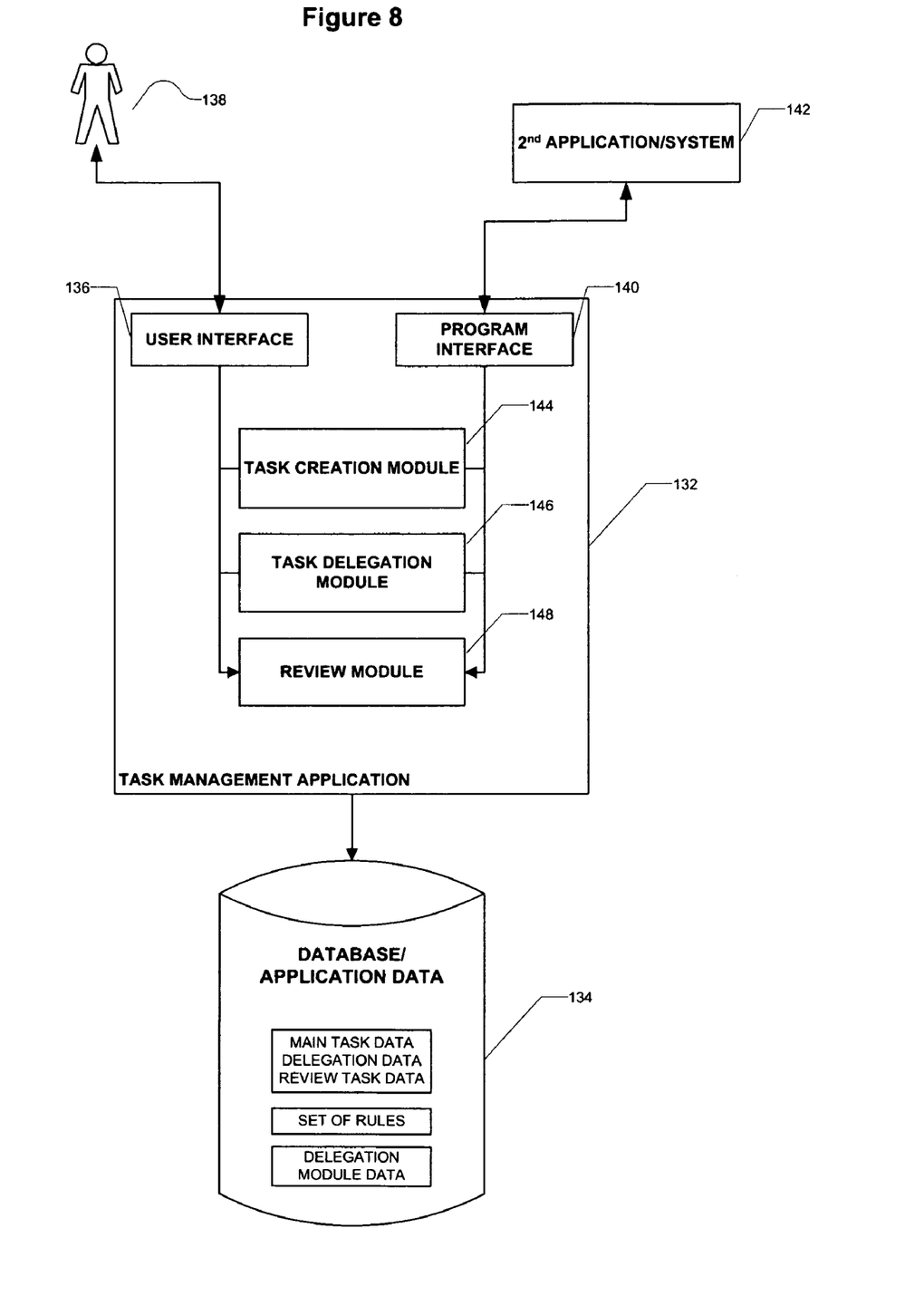
FIG. 8 is a block diagram showing a system for creating a review task according to an exemplary embodiment of the present invention.

For example, where a principal decides that a task should be performed by another principal or delegatee, the principal or delegator delegates the main task to a delegatee by entering the relevant information via the user interface. This may be an ad hoc delegation. Alternatively, the delegation module 38 may obtain delegation module data from the database (as shown in FIG. 8) where a particular rule determines that a task should automatically be delegated to a delegatee. An example of such a rule is where a delegator is out of the office and has activated an out of office rule. It will be appreciated that the delegation module 38 will find particular application in application programs based on workflow. Such an automatic delegation rule ensures that the task is completed without delay, without having to wait for an input from a delegator.

FIG. 3 shows that, on delegating the main task, a review task is created in operation 40, with the review task being assigned in operation 42. The review task is assigned to the delegator to ensure that the delegator retains responsibility for the effective completion of the task delegated. Review data 52 is created on the creation of the review task and includes, as shown in FIG. 4, review identification information which is also stored under the main task data to directly link the particular review task with the main task. The review data 52 defines parameters for reviewing the main task (e.g., the evidence that should be presented to the delegator). The review data 52 further includes data relating to a timeframe for completing the review task.

Once the delegatee has performed the main task, evidence is created (shown in operation 44) as confirmation that the main task has been completed. The evidence is directly related to the main task, and is typically defined by the review data on creation of the review task. The evidence is now presented to the delegator to enable the delegator to perform the review task. Once the review task has been performed, data on this completed review task is stored in operation 46. This data may typically include information on the created evidence and the completed main task.

Figure 5:
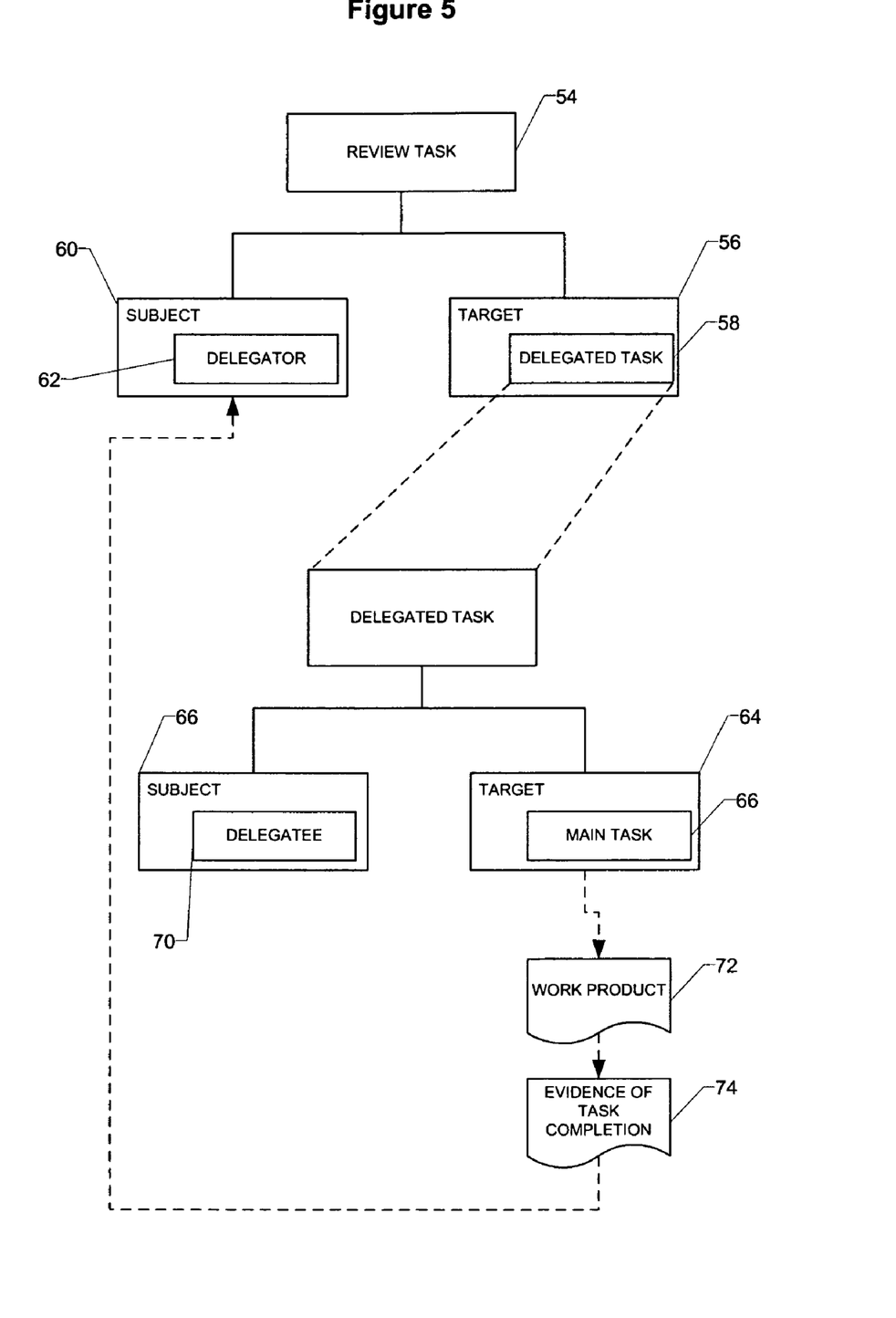
FIG. 5 is a block diagram showing the structure of a review task according to an embodiment of the present invention.

FIG. 5 is a diagrammatic representation of a structure of a review task 54 created according to an exemplary embodiment of the present invention. The target 56 of the review task 54 is the delegated task 58 (e.g., the original main task that has been delegated). As discussed, this means that the review task 54 has to be performed with respect to the delegated task 58, or with respect to at least aspects of the delegated task 58. The review task 54 has as its subject 60 the delegator 62, which means that the delegator 62 is the business object or principal who must perform the review task 54.

Taking a step back, the delegated task 58 has as its target 64 the original main task 66, and has as its subject 68 the delegatee 70. From the attributes of a task defined above, this indicates that the delegated task 58 is to be performed by the delegatee 70 and that the task to be performed is the main task 66.

Once the delegated task 58 is performed by the delegatee 70, a work product 72 is produced. This work product 72 may be evidence 74 of the completion of the main task or alternatively, evidence 74 indicating that the main task 66 has been performed may be created from the work product 72. The evidence 74 may be directly associated with the main task 66, indicating that this task 66 has been completed. The evidence 74 is presented to the delegator 62 and forms the basis or at least aspects of the review task 54. The evidence 74 ensures that the delegator 62 is in a position to perform his obligation of making sure that the delegated task 58 has been carried out satisfactory.

Figure 6:
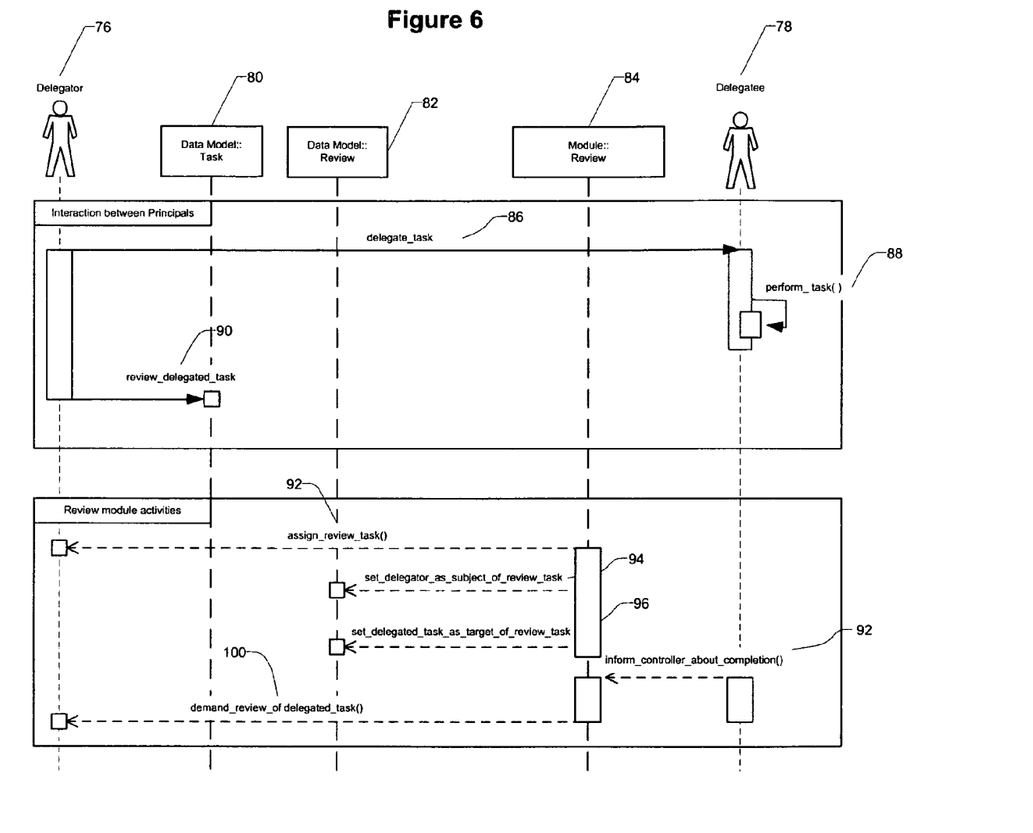
FIG. 6 is a sequence diagram showing the interaction between the delegator and delegatee, different data models and the review module.

Turning now to FIG. 6, a sequence diagram illustrates an operational sequence, according to one example of the present invention. This sequence diagram shows the interaction between a delegator 76, delegates 78, a data model for the main task 80, a data model for the review task 82 and review module 84. The interaction between the principals commences with the delegator 76 delegating 86 a main task, now the delegated task, to a delegatee 78. After the delegatee 78 has performed 88 the delegated task, the delegator 76 has to review 90 the completed task, i.e. the delegated task.

Review activities commence with a review task being assigned 92 by the review module 84. During this assignment, the review module 84 sets 94 the delegator 86 as the subject of the review task and further sets the delegated task as the target 96 of the review task. Once the delegated task has been completed by the delegatee, the review module 84 is informed of the completion 98. The review module 84 then demands 100 that the review task assigned to the delegator is performed 90 by the delegator 76. The interaction between the respective data models and the review module forming part of a system, which is described in further detail below with reference to FIG. 8.

It will be appreciated that a delegated task may be delegated, by a first delegatee, to further or subsequent delegatees. An example of a further delegation is where an incoming customer query needs to be resolved by a consultant A. In the circumstances, consultant A may not have the required technical knowledge to effectively deal with the query (or portion of the query), and he therefore delegates the task (or a portion of the task) to a further consultant B. This further consultant B may in turn also not be able to resolve the query and delegates the task further to consultant C. In the present example, two review relationships (and review tasks) are created, the first between consultant A and B, and the second between consultant B and C. The review tasks again seek to provide accountability in the process of delegation, even where tasks are further delegated.

It will be understood that all delegations, but in particular subsequent delegations, may be enforced according to a set of rules that will either allow or reject a subsequent delegation. The rules typically depend on the organisational context of the delegation. Examples of rules are discussed in more detail below.

Figure 7:
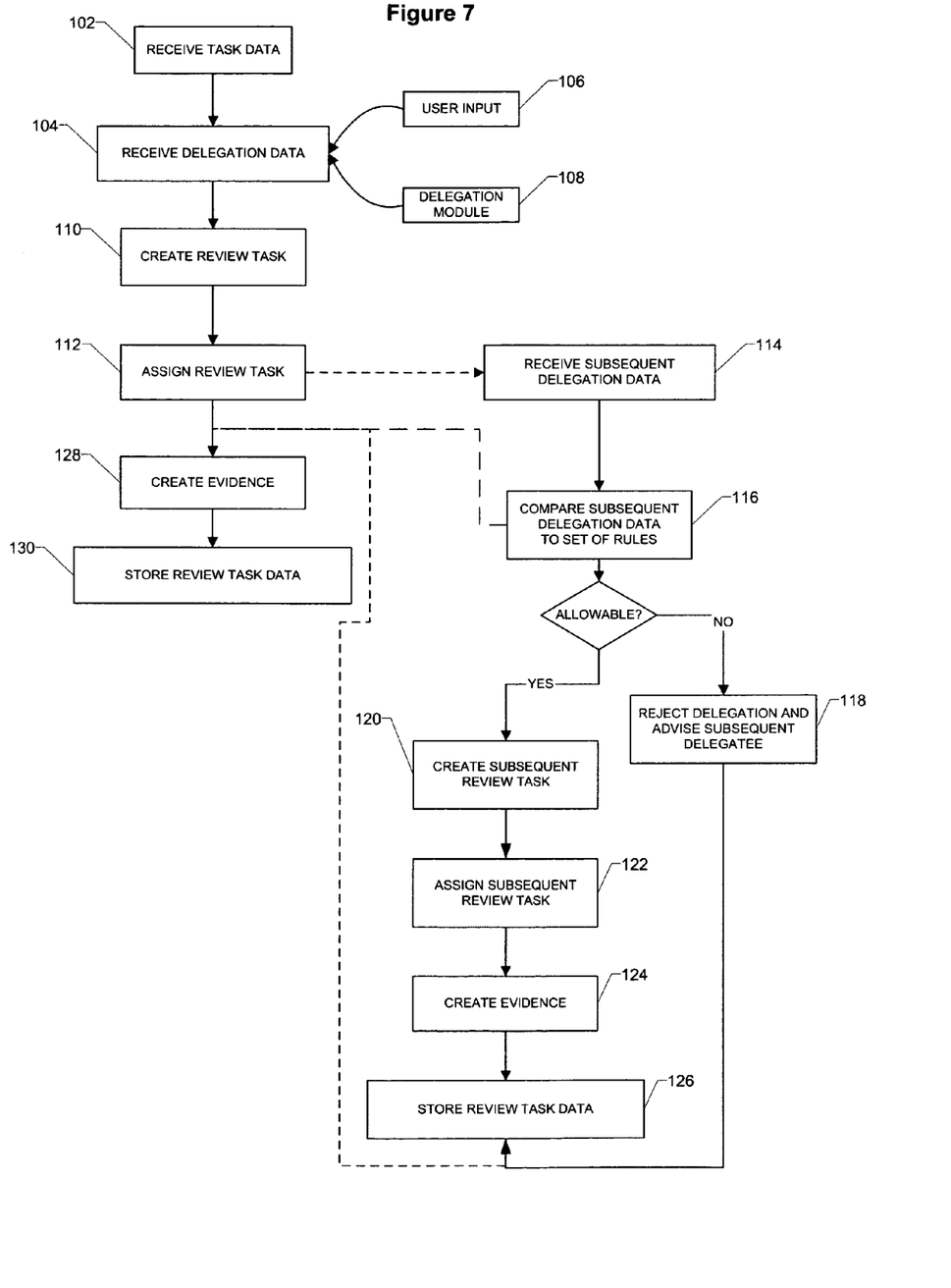
FIG. 7 is a detailed flow diagram showing the method operations of a further embodiment of the present invention.

FIG. 7 depicts a detailed flow diagram incorporating subsequent delegations and a set of rules which regulates subsequent delegations of tasks according to a further embodiment of the present invention.

In an application program, task data defining a main task to be performed is received in operation 102. Delegation data is received according to operation 104 of the flow diagram either via a user interface 106 or via a delegation module 108.

As described above, the user input 106 is used where a delegator decides that the task should be performed by another person or delegatee. The delegator then creates a delegation path to the delegatee by the user interface. Alternatively, the application program may make use of a delegation module 108, which receives delegation module data from a database when particular circumstances exist.

On delegating the main task, a review task is created in operation 110 which review task is assigned in operation 112 to the delegatee. As previously described, review data is created during the process of creating the review task.

In the present embodiment, subsequent delegation data is received in operation 114. This subsequent delegation data may, similar to the first delegation data, be received from the first delegatee via a user input 106 or via the delegation module 108. Again, this information identifies the first delegatee as a subsequent delegator of the main task. The information further includes information identifying a subsequent delegatee. Alternatively, in certain circumstances such as when the first delegatee is out of this office, the delegated task may be automatically assigned to a subsequent delegatee by the delegation module 108. The delegation module 108 would typically obtain information from the database to define the subsequent delegator and subsequent delegatee.

The subsequent delegation data is compared to a set of rules in operation 116 to determine whether the delegation is allowable. For example, set of rules may include a limitation on the number of subsequent delegations which is allowable. Specifically, certain important tasks may only be delegated once, while other smaller tasks may be delegated three times. The set of rules may also specify that a review task can never be delegated and should therefore be completed by the respective delegator. In a further embodiment, the set of rules may disqualify the first delegator or subsequent delegators from being subsequent delegatees. It is foreseen that other rules may restrict the delegation of tasks within a time period prior to the deadline of completing the task. As further examples, rules may specify that a clerk can only delegate within his branch, or that a senior sales representative may only delegate to staff in his sales region.

Should the subsequent delegation data that is received not be allowable according to the set of rules, the delegation of the task will be rejected and the subsequent delegator (first delegates) will be advised in operation 118. The responsibility of completing the delegated task is then returned to the first delegates (subsequent delegator). If the first delegates then completes the main task without any further delegation, evidence is created on the completion of the task. As before, the evidence then forms the basis of the review task to be performed by the delegator. Once the review task has been performed, data on this completed review task is stored in operation 130. This data may typically include information on the evidence, the completed main task, and the failed subsequent delegation.

In the event that the subsequent delegation data conforms to the set of rules, a subsequent review task is created in operation 120, with the subsequent review task being assigned to the subsequent delegator (first delegates) in operation 122. On completion of the main task, i.e. the subsequent delegated task, by the second delegatee, evidence is created in operation 124. This evidence confirms that the main task has been completed by the second delegatee and is used by the subsequent delegator (first delegatee) in completing the subsequent review task. Once the subsequent delegator (first delegatee) has performed the subsequent review task, data relating to this subsequent review task is stored in the database in operation 126. This data may include information on the evidence, the completed main task, and the subsequent delegation.

The stored subsequent review task data, together with the evidence created when the main task was completed by the subsequent delegatee, are used to create further evidence in operation 128, with this evidence being used by the first delegator to review the delegated task.

The creation of evidence may furthermore be context-dependent. The delegator can, in one embodiment, also define the evidence himself or select evidence (e.g., specific information or a specific type of information) from one or more automatically provided "evidence" suggestions that are generated and presented by the system.

Turning now to FIG. 8, a system for the creation of a review task according to an exemplary embodiment of the present invention is shown. This system comprises a task management application 132 and a database 134, the database 134 containing data relating to the main task, delegation of the task and review data.

The task management application 132 has a user interface 136 that may be used by a principal 138 to input data for use by the task management application 132. For example, the delegator may use the user interface 136 to input task data relating to a main task to be performed. The user interface 136 may further be used by the delegatee to complete the main task or may be used by the delegator to complete the review task.

A task creation module 144 of the task management application 132 receives the task data relating to a main task to be performed and creates a main task based on the received information.

The task management application 132 may also receive (or generate) data relating to the delegation of the main task. This data may be received via the user interface 136, in which case the user interface 136 is used by the delegator to identify him- or herself as the delegator of the main task and also to identify a delegatee to perform the main task. In this example the delegator commissions an ad hoc delegation task.

Alternatively, delegation data may be received via the task delegation module 146, which receives delegation data identifying a delegator and a delegatee to perform the main task. This information is received from the database 134 in which delegation module data is stored. As mentioned, the task delegation module 146 is used where a particular rule determines that a task should automatically be delegated to a delegatee. Automatic delegation rules ensure that tasks are completed without delay.

The task management application 132 further includes a review module 148 that creates a review task with at least aspects of the main task being the object of the review task.

The task management application 132 further includes the review module 148, which assigns the review task to the delegator of the main task and also assigns the delegated task as the target of the review task.

As mentioned the system further includes a database 134. The database 134 stores the main task data, delegation data and review task data. The database 134 is also used to store the set of rules that govern delegations, and in particular, subsequent delegations. Task modulation data is also stored in the database.

The data stored in the database is used whenever information is required regarding details such as the person responsible for currently performing a task; the origin and ownership of the initial task and the delegation sequence of the task. Such information may be presented in the form of a task report, which contains information on the main task, delegators and delegatees, evidence on the completion of tasks, and other delegation information.

A program interface 140 also forms part of the task management application 132 and is used to connect the task management application 132 to a second application or system 142. It would be appreciated that the task management application 132 may either be interfaced to a second application or system, or may alternatively form a part of Enterprise Resource Planning software, such as SAP or other applications.

Figure 9:
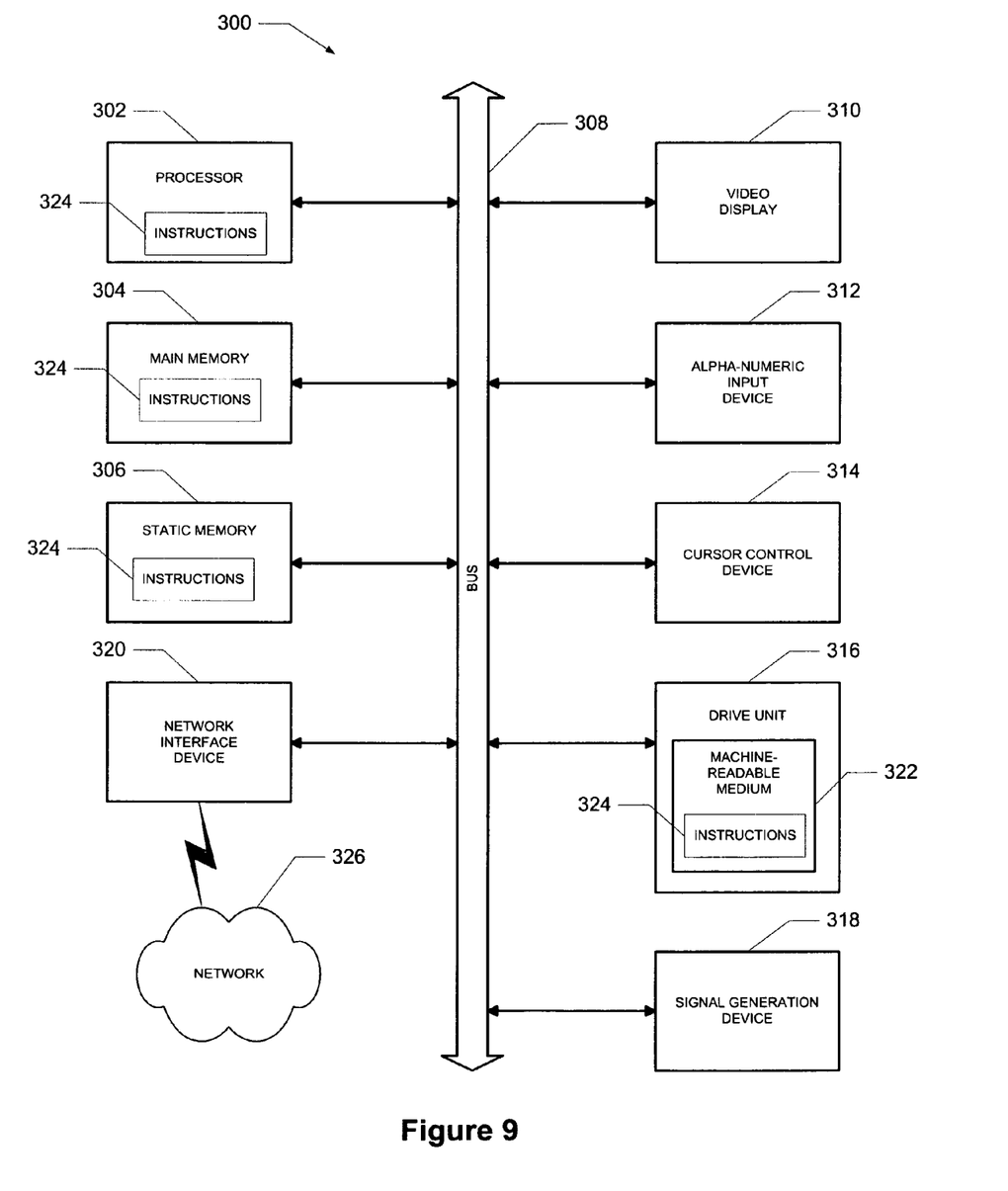
FIG. 9 is a block diagram illustrating a machine for performing the method for creating a review task according to an exemplary embodiment of the present invention.

FIG. 9 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU), a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a user interface (UI) navigation device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions and data structures (e.g., software 324) embodying or utilized by any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320 utilizing any one of a number of well-known transfer protocols (e.g., HTTP).

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals. Although an embodiment of the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

The invention claimed is:

1. A computerized method for creating a review task, the method comprising:
receiving task data, the task data including information regarding a main task to be performed;
receiving delegation data, the delegation data including information identifying a first delegator of the main task and a first delegatee to perform the main task;
creating a review task, with the review task having as its object at least aspects of the main task;
assigning the review task to the first delegator of the main task;
receiving subsequent delegation data from the first delegator, the subsequent delegation data including information identifying the first delegatee as a subsequent delegator of the main task and a subsequent delegatee to perform the main task;
creating a subsequent review task having at least aspects of the main task as an object to be reviewed;
assigning the subsequent review task to the subsequent delegator of the main task; and
storing review tasks data based on the main task when completed.

2. The method of claim 1, wherein the delegation data is received from a user input device.

3. The method of claim 1, wherein the delegation data is received from a delegation module.

4. The method of claim 1, further comprising creating evidence indicating that the main task has been completed, the evidence being associated with the review task and being stored as part of the review task data.

5. The method of claim 1, further comprising comparing the subsequent delegation data to a set of rules, thereby to determine whether the subsequent delegation is allowable.

6. The method of claim 5 wherein the set of rules limits a number of subsequent delegations.

7. The method of claim 5 wherein the set of rules disqualify the first delegator or subsequent delegators from being subsequent delegatees.

8. A machine readable storage medium comprising instructions, which executed by a machine, cause the machine to perform a method for creating a review task, the method comprising:
receiving task data, the task data including information regarding a main task to be performed;
receiving delegation data, the delegation data including information identifying a first delegator of the main task and a first delegatee to perform the main task;
creating a review task, with the review task having as its object at least aspects of the main task;
assigning the review task to the first delegator of the main task;
receiving subsequent delegation data from the first delegator, the subsequent delegation data including information identifying the first delegatee as a subsequent delegator of the main task and a subsequent delegatee to perform the main task;
creating a subsequent review task having at least aspects of the main task as an object to be reviewed;
assigning the subsequent review task to the subsequent delegator of the main task; and
storing review tasks data based on the main task when completed.

9. The machine-readable storage medium of claim 8, wherein the method further comprises creating evidence indicating that the main task has been completed, the evidence being associated with the review task and stored as part of the review data.

10. The machine-readable storage medium of claim 8, wherein the method further comprises comparing the subsequent delegation data to a set of rules, thereby to determine whether the subsequent delegation is allowable.

11. A computer system for creating a review task, the computer system comprising:
a task management application, wherein the task management application comprises:
user interface to receive task data including information on a main task to be performed, and to receive a delegation data including information identifying a first delegator of the main task and a first delegatee to perform the main task;
a review module to create a review task with having as its object at least aspects of the main task, to assign the review task to the first delegator of the main task, to receive subsequent delegation data from the first delegator, the subsequent delegation data including information identifying the first delegatee as a subsequent delegator of the main task and a subsequent delegatee to perform the main task, to create a subsequent review task having at least aspects of the main task as an object to be reviewed, and to assign the subsequent review task to the subsequent delegator of the main task; and
a database to store the main task data, delegation data and review tasks data.

12. The computer system of claim 11 further comprising:
a program interface to link at least the user interface, review module, and database to a second application or system.

13. The computer system of claim 11 further including a task creation module to create a main task based on the received task data.

14. A computer system for creating a review task, the computer system comprising:
means for receiving task data, the task data including information regarding a main task to be performed;
means for receiving delegation data, the delegation data including information identifying a first delegator of the main task and a first delegatee to perform the main task;
means for creating a review task, with the review task having as its object at least aspects of the main task;
means for assigning the review task to the first delegator of the main task;
means for receiving subsequent delegation data from the first delegator, the subsequent delegation data including information identifying the first delegatee as a subsequent delegator of the main task and a subsequent delegatee to perform the main task;
means for creating a subsequent review task having at least aspects of the main task as an object to be reviewed;
means for assigning the subsequent review task to the subsequent delegator of the main task; and
means for storing review tasks data based on the main task when completed.

15. The computer system of claim 14 further including means for creating the main task based on the received data.

16. The computer system of claim 14 wherein the means for receiving task data is a user interface.

17. The computer system of claim 14 wherein the means for receiving delegation data is a user interface or a task delegation module.

18. The computer system of claim 14 wherein all means for creating a review task, means for assigning the review task, means for receiving subsequent delegation data, means for creating a subsequent review task, and means for assigning the subsequent review task is a review module.

19. The computer system of claim 14 wherein the means for storing review tasks data is a database.

20. The computer system of claim 15 wherein the means for creating the main task is a task creation module.

* * * * *